United States Patent
Uhm

Patent Number: 5,410,575
Date of Patent: Apr. 25, 1995

[54] DETECTION OF BURIED NITROGEN RICH MATERIALS

[75] Inventor: Han S. Uhm, Potomac, Md.

[73] Assignee: The United States of America as represented by the Secretary of the Navy, Washington, D.C.

[21] Appl. No.: 10,036

[22] Filed: Jan. 27, 1993

[51] Int. Cl.⁶ .............................................. G21G 1/06
[52] U.S. Cl. .................................... 376/159; 376/160
[58] Field of Search ....................... 376/159, 160, 161; 89/1.13; 102/402; 342/459

[56] References Cited

U.S. PATENT DOCUMENTS

| | | | |
|---|---|---|---|
| 2,652,530 | 9/1953 | Davidson | 342/459 |
| 3,124,679 | 3/1964 | Tittman et al. | 376/159 |
| 3,146,349 | 8/1964 | Jordan | 376/159 |
| 3,463,922 | 8/1969 | Senftle et al. | 376/159 |
| 3,492,479 | 1/1970 | Lowery et al. | 376/159 |
| 3,638,020 | 1/1972 | Duffey et al. | 376/159 |
| 3,826,215 | 7/1974 | Dyjak | 102/402 |
| 3,930,154 | 12/1975 | Scott | 376/160 |
| 4,021,725 | 5/1977 | Kirkland | 342/459 |
| 4,568,510 | 2/1986 | Caldwell | 376/159 |
| 4,641,566 | 2/1987 | Pomeroy | 89/1.13 |
| 4,756,866 | 7/1988 | Alvarez | 376/157 |
| 4,851,687 | 7/1989 | Ettinger et al. | 376/159 |
| 4,896,116 | 1/1990 | Nagashima et al. | 342/459 |
| 5,144,140 | 9/1992 | Allyson et al. | 376/159 |

OTHER PUBLICATIONS

ANL/CP-76141, (Jul. 22, 1992), Rhodes et al, (identified as pp. 1-9).
Nucl. Instrum. Methods Phys. Res., Sect. B, (1991), pp. 834-838, Habiger et al.
Turk. J. Nucl. Sci., vol. 13, (1986), pp. 23-35, Avinc.
AD-784612, (Apr. 1974), pp. 1-14, Roder et al.
Nucl. Sci. Eng., vol. 110, (1992), pp. 417-424, Campbell et al.
Nuclear Instruments and Methods, vol. 87, (1970), No. 1, pp. 37-43, Trombka et al.
J. of Radioanalytical and Nuclear Chemistry, Articles, vol. 84, (1984), pp. 67-87, Nadkarni.

*Primary Examiner*—Behrend E. Harvey
*Attorney, Agent, or Firm*—Jacob Shuster

[57] ABSTRACT

Fast neutrons from a moving source are thermalized by travel through water to a soil embedded body of nitrogen-rich material causing emission of gamma rays therefrom. Emitted gamma rays are detected at a location adjacent the neutron source for measurement of radiation energy from which location of nitrogen-rich materials in the soil is mapped, based on a predetermined signature energy level of the measured radiation.

11 Claims, 4 Drawing Sheets

DETECTION OF BURIED NITROGEN RICH MATERIALS

BACKGROUND OF THE INVENTION

This invention relates to the location of nitrogen-rich materials, such as explosives, by detection of gamma rays emitted in response to capture of neutrons by such materials.

Apparatus for generating fast neutrons that are moderated and captured by nitrogen-rich materials to be analyzed from detection of resulting emission of gamma rays therefrom, is already well known as disclosed for example in U.S. Pat. Nos. 4,171,485, 4,278,885 and 4,882,121, to Marshall, von Alfthan et al. and Gremier, respectively. Use of such apparatus is however limited to the analysis of materials located in the immediate vicinity of the apparatus because of operational parameters associated therewith.

Accordingly, it is an important object of the present invention to provide a system for mapping the location of nitrogen-rich materials, buried in soil and water as embedding media, by measurement of gamma radiation emitted in response to capture of neutrons from a moving source.

SUMMARY OF THE INVENTION

In accordance with the present invention nitrogen-rich materials buried underwater in soil as the embedding medium is identified and mapped by detection of gamma radiation at a signature energy level above 8 MeV. Such gamma radiation is emitted from the nitrogen-rich materials in response to capture therein of thermalized neutrons from a neutron source in a moving unit with which the gamma radiation detector is associated.

According to one embodiment of the invention, the neutron source utilizes an electrically powered neutron generating tube with a safety interlock from which fast neutrons are produced and directed for travel a substantial distance through water and soil before capture by the nitrogen-rich materials. According to other embodiments, a fission type neutron source is utilized in a portable or hand-carried detector unit. Protective shielding types of housings are utilized for the neutron source and detector components of the movable detector apparatus, with which a programmed data processor is associated for identification, location and mapping of nitrogen-rich materials.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
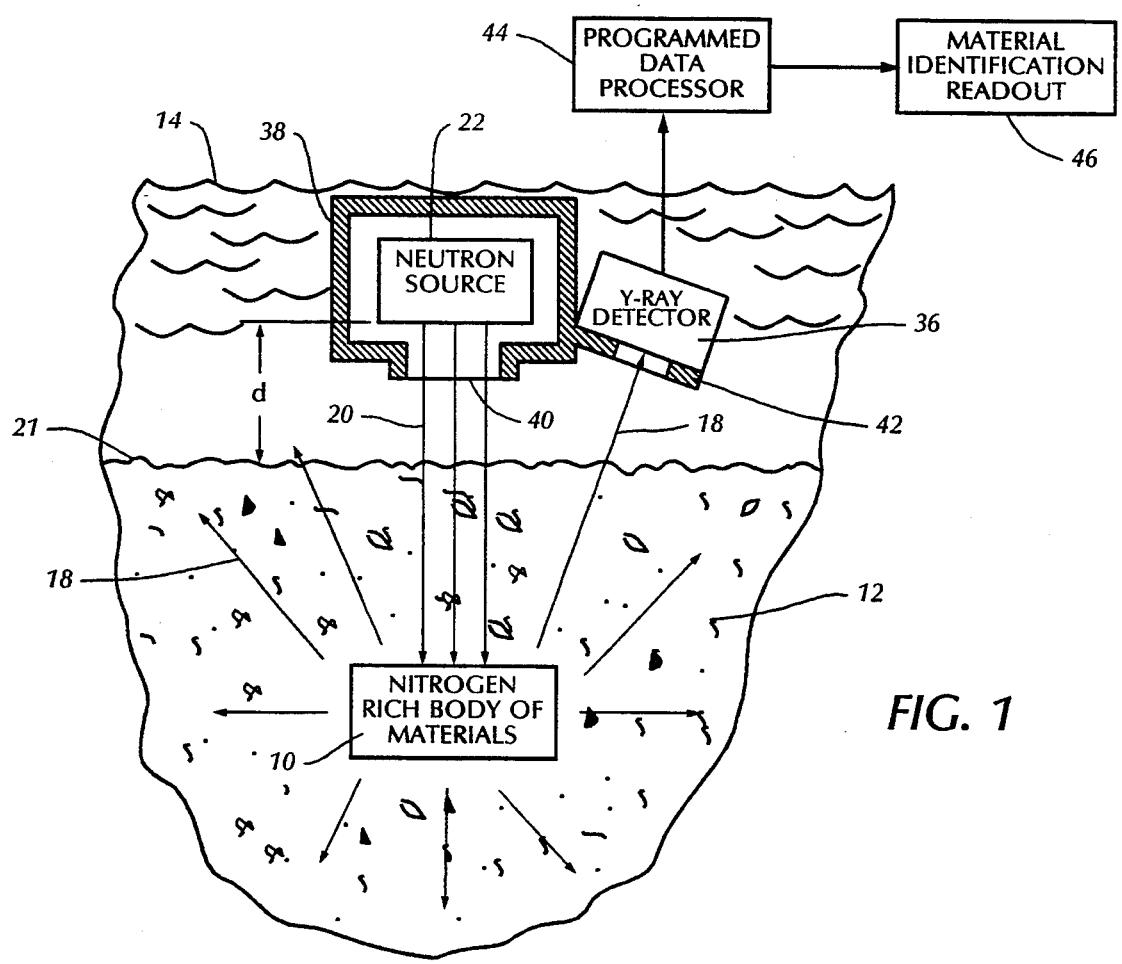
FIG. 1 is a schematic partial section and diagrammatic view illustrating a typical installation of the detector system of the present invention.

Referring now to the drawing in detail, FIG. 1 schematically illustrates a nitrogen-rich body of material 10 buried in a soil bed 12 below the surface 14 of a body of sea water 16. The body of material 10 may be explosives, for example, having a high concentration of nitrogen atoms emitting high energy gamma ($\gamma$) rays 18 when excited by capture therein of thermal neutrons 20 as diagrammed in FIG. 1.

According to the embodiment of the invention depicted in FIG. 1, the thermal neutrons 20 originate from an electrical neutron source 22 located a distance (d) above the sea bottom 21. The source 22 as diagrammed in FIG. 2 includes a high-voltage power supply 24, such as a 4-kW electrical source, under control of a safety interlock switch 26. The power supply is connected to a completely sealed neutron generator such as a portable CW neutron tube 28 within which a fusion reaction occurs under electrical power control to accelerate a mixed beam of deuterium and tritium ions striking a target 30 containing both deuterium and tritium ions. The ion accelerating generator tube 28 and target 30 are cooled with freon and water by a cooling system 32 to enable prolonged operation.

The aforementioned fusion reaction in the generator tube 28, involves the fusing of deuterium (D) and tritium (T) atoms to produce a helium (He) atom and a neutron (n) with an energy of 14.1 MeV, for example. Typically such neutron tube generators operate at about 200 kV with an ion current of a few milliamperes to generate $10^{11}$ neutrons per second within an emission beam.

The intensity of the thermal neutron flux of the emission beam to the target component 30 from the neutron source 22 is such as to accommodate propagation of the neutrons 20 through the seawater 16 for the distance (d) and penetration of the soil bed 12 as diagrammed in FIG. 1. The neutron emission intensity is further reduced within the soil bed until the neutrons reaching the body of materials 10 are captured therein. Based on a neutron intensity level of 14 MeV as aforementioned for the emission output of the neutron source 22, a reasonable and sufficient neutron penetration distance is assured for purposes of the present invention.

In response to capture of the thermal neutrons 20 by the nitrogen atoms in the body of material 10, gamma rays 18 of 10.8 MeV energy level are emitted. Utilizing $\gamma$-ray detector 36 located near the neutron source 22 as shown in FIG. 1, only a fraction of the $\gamma$-rays 18 propagate back toward the detector. During propagation through soil 12 and water 16, the intensity of the $\gamma$-rays 18 is reduced by attenuation.

The $\gamma$-ray detector 36 according to one embodiment of the invention consists of an array of commercially available sodium-iodine or BGO crystals. Such detector 36 is shielded from the thermal neutrons in the water 12 to avoid smear out of the $\gamma$-ray spectrum. A few millimeters of cadmium over the detector crystals is utilized for this purpose in accordance with prior art experience such as the shielding of detector crystals from thermal neutrons demonstrated in oil-well logging installations.

In order to shield the neutron source 22 to avoid excessive operator absorption of neutrons, a housing 38 made of high neutron absorption material encloses the neutron source, as diagrammed in FIG. 1. The housing 38 is provided with a window 40 through which the beam of neutrons 20 is directed toward the sea bottom. An extension arm 42 projects from the housing 38 for support of the γ-ray detector 36 spaced a sufficient distance from the neutron source for the additional radiation protection provided by the shielding action of water between the neutron source and the detector. Such common mounting of the neutron source 22 and γ-ray detector 36 forms a movable unit through which tracking and location of buried nitrogen-rich materials may be effected.

With continued reference to FIG. 1, the signal output of the γ-ray detector 36 is applied as an input to a data processor 44 programmed to determine from such input the presence and location of the nitrogen-rich body of material 10, such as an underwater buried explosive mine. Readout of the programmed data processor 44 is accordingly displayed by a material identification component 46, as diagrammed in FIG. 1, to accommodate the tracking of underwater buried explosive mines.

Programming of the data processor 44 is based on development of a basic theoretical model applicable to the detection of the body of nitrogen-rich materials 10 buried underwater in the seabed soil 12 as hereinbefore described with respect to FIG. 1. An important factor in nitrogen-rich material detection in water is the thermalization physics of the fast neutron source 22. The fast neutrons are thermalized by sea water during propagation in accordance with the present invention, whereby some of the thermal neutrons are absorbed by hydrogen atoms. The thermal neutron density is therefore measured in terms of propagation distance and initial fast neutron flux through a theoretical model developed to reflect neutron transport, on the assumption that the fast neutron source is located at the origin. For convenience in the subsequent analysis, the normalized thermal neutron flux $\phi(r)$ is divided by the number of fast neutrons from the source per unit time. Such normalized thermal neutron flux $\phi(r)$ is inversely proportional to a length-squared. Based on the continuous slowing down model (sometimes called the Fermi age model), the normalized thermal flux $\phi(r)$ is expressed as:

density of the i-species nuclei. The parameter $\tau$ in Eq. (1) is the Fermi age defined by:

$$\tau = \int_0^E \frac{d\epsilon/\epsilon}{\left(\sum_1^N a_i \sigma_{si} n_i\right)\left(\sum_1^N \xi_i \sigma_{si} n_i\right)}, \quad (3)$$

where $\xi_1$ is the average logarithmic energy decrement per collision.

Numerical calculation of the thermal neutron flux requires experimental data for the propagating medium, including the diffusion constant D, the reciprocal length k and the Fermi age $\tau$. The reciprocal length and diffusion constants are determined from the absorption and scattering cross sections of moderator nuclei for thermal neutron. The diffusion constant and the reciprocal length in media such as the sea water 16 and polyethylene is available in the field of nuclear reactor engineering, as summarized in Table I below.

TABLE I

| Diffusion constant D and reciprocal length κ in water and polyethylene at room temperature | | | |
|---|---|---|---|
| Moderate Medium | Molecular Density (cm$^{-3}$) | D (cm) | κ (cm$^{-1}$) |
| Water | H$_2$O | 3.4 × 10$^{22}$ | 0.18 | 0.34 |
| Polyethylene | CH$_2$ | 4.15 × 10$^{22}$ | 0.14 | 0.41 |

[a]Samuel Glasstone, Principles of Nuclear Reactor Engineering, (D. Van Nostrand, New York 1955) Chap. 3.

The Fermi age $\tau$ is a function of the fast neutron energy E as shown in Eq. (3). In order to calculate the Fermi age in Eq. (3), scattering cross section $\sigma_s(\epsilon)$ of moderator nuclei must be measured in terms of the neutron energy $\epsilon$. Tabulated experimental data of the scattering cross section for various kind of nuclei substituted into Eq. (3) and integrated over energy from $\epsilon=0$ to the fast energy E, provides the Fermi age $\tau$, which is graphically presented in FIG. 3 for various moderator materials. As expected from Eq. (3), the Fermi age increases drastically as the neutron energy E increases.

$$\phi(r) = \frac{\exp(k^2\tau)}{2\pi r D k \sqrt{4\pi\tau}} \left\{ \frac{\exp(-kr)}{2} \left[ \exp\left(-\left\{\frac{r}{2\sqrt{\tau}} + k\sqrt{\tau}\right\}^2\right) - \exp\left(-\left\{\frac{r}{2\sqrt{\tau}} - k\sqrt{\tau}\right\}^2\right) \right] + \right.$$

$$\frac{\exp(kr)}{2} k\sqrt{\pi\tau} \left[ erf\left(\frac{r}{2\sqrt{\tau}} - k\sqrt{\tau}\right) + erf\left(\frac{r}{2\sqrt{\tau}} + k\sqrt{\tau}\right)^2 \right] +$$

$$\sinh(kr)\left[\exp\left(-\left\{\frac{r}{2\sqrt{\tau}} + k\sqrt{\tau}\right\}^2\right) - k\sqrt{\pi\tau}\, erfc\left(\frac{r}{2\sqrt{\tau}} + k\sqrt{\tau}\right)\right] \right\} \quad (1)$$

where $erfc(x) = 1 - erf(x)$ is the error function defined by $erf(x) = (2/\sqrt{\pi}) \int_0^x dt \exp(-t^2)$. In Eq. (1), the parameter D denotes the diffusion constant of thermal neutron in medium and the reciprocal length k of thermal neutrons is defined by:

$$k^2 = \frac{\sum_1^N \sigma_{ai} n_i}{D}, \quad (2)$$

where $\sigma_{ai}$ is the thermal-neutron absorption cross-section of nuclei of species i in the moderator and $n_i$ is the The Fermi age of polyethylene is less than that of water, which is consistent with the high hydrogen density in polyethylene as shown in Table I. Strictly speaking, the continuous slowing-down model does not apply to media containing hydrogen. In this case, the Fermi age $\tau$ is roughly equivalent to $r_s^2/6$ for thermal neutrons, which can be determined by other means. Such theoretical results based on the slowing-down model agree remarkably well with experimental data even for media containing hydrogen. The mean-square slowing-down distance $r_s = \sqrt{6\tau}$ represents thermalization distance for fast neutrons.

Figure 4:
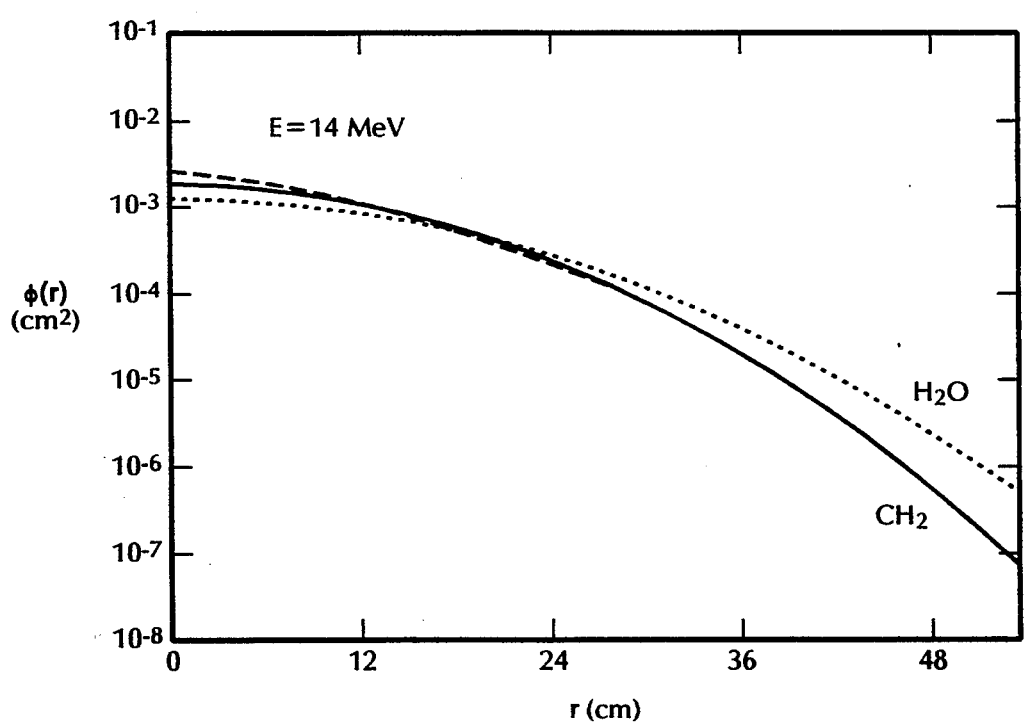
Figure 5:
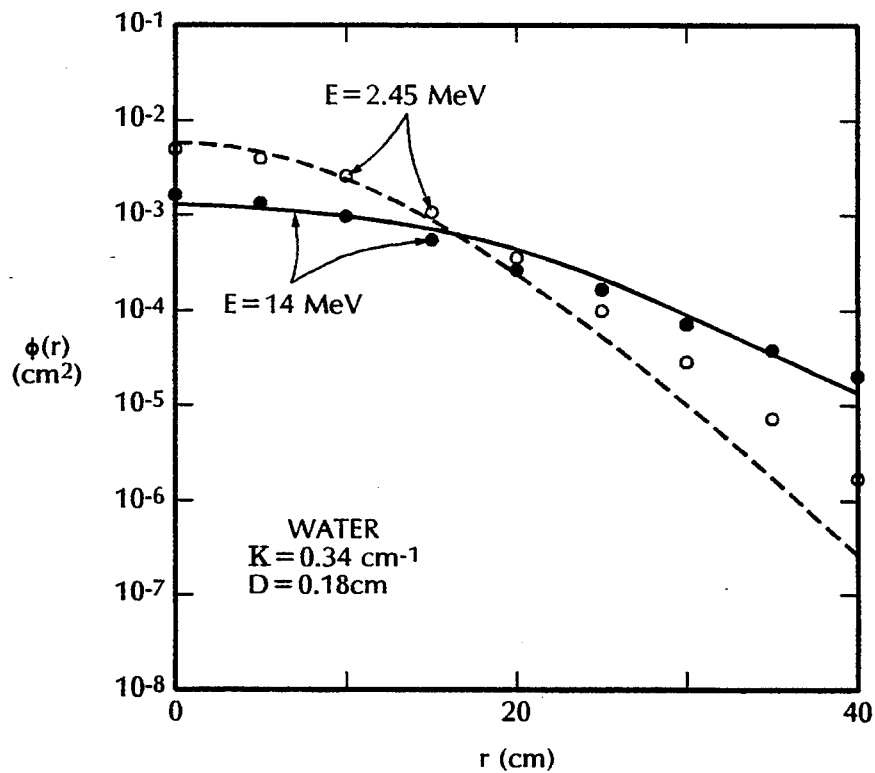

The normalized thermal neutron flux $\phi(r)$ is calculated by substituting the diffusion constant D, the reciprocal length k and the Fermi age $\tau$ into Eq. (1) for a specified value of fast neutron energy E. Shown in FIG. 4 are plots of the normalized neutron flux $\phi(r)$ versus the radius r for fast neutron energy of E=14 MeV, and light water (H$_2$O: dotted line) and polyethylene (CH$_2$: solid line). The 14 MeV neutrons are generated from the deuterium-tritium nuclear reaction in the generator 28 diagrammed in FIG. 2. The Fermi ages for the fast neutron energy of E=14 MeV are $\tau$=83 cm$^2$ for ordinary water and $\tau$=63 cm$^2$ for polyethylene, as determined from FIG. 3. The theoretical result (solid line in FIG. 4) obtained from Eq. (1) agrees remarkably well with simulation data (broken line in FIG. 4), which have been obtained by a Monte Carlo simulation calculation for a polyethylene moderator with its radius of 40 cm. The normalized thermal neutron flux at the origin (r=0) is given by $\phi_0 = 1.3 \times 10^{-3}$ cm$^{-2}$ for ordinary water and $\phi_0 = 1.73 \times 10^{-3}$ cm$^{-2}$ for polyethylene. The normalized thermal neutron flux in ordinary water is calculated from Eq. (1) and is plotted against the radius r in FIG. 5 for fast neutron energy of E=14 MeV (solid line) and E=2.45 MeV (broken line), which corresponds to neutrons generated from the deuterium-deuterium nuclear reaction. The experimental data for E=14 MeV (closed dots) and E=2.45 MeV (open dots) presented in existing literature agree reasonably well with theoretical results for a broad range of physical parameters except the far field region for relatively low fast-energy. For example, in the range of r satisfying r>25 cm in FIG. 5, the theoretical curve (broken line) of the energy E=2.45 MeV deviates significantly from the experimental data (open dots). As aforementioned, the absorption cross section $\sigma_a$ of hydrogen atoms for thermal neutrons are in the range between 0.19 barn and 0.34 barn according to different experiments and the diffusion constant of thermal neutron in water is a sensitive function of experimental conditions. It should therefore be noted that the reciprocal length k=0.34 cm$^{-1}$, on which the theoretical calculation has been based, may not correctly represent the previous experiments. Thus, the discrepancy between the theoretical values and measured data for r>25 cm and E=2.45 MeV in FIG. 5 may originate from inadequate reciprocal length of k=0.34 cm$^{-1}$.

In the range of r satisfying r>>2k$\tau$, the thermal neutron flux $\phi(r)$ is approximately given by

$$\phi(r) = \frac{\exp(k^2\tau)}{4\pi D} \frac{\exp(-kr)}{r}, \tag{4}$$

which decreases monotonically as the radius r increases. Equation (4) is the far field approximation of Eq. (1). For a relatively small absorption cross section of moderator nuclei characterized by k<<1 cm$^{-1}$, Eq. (4) represents the normalized thermal neutron flux for a wide range of radius r.

Figure 6:
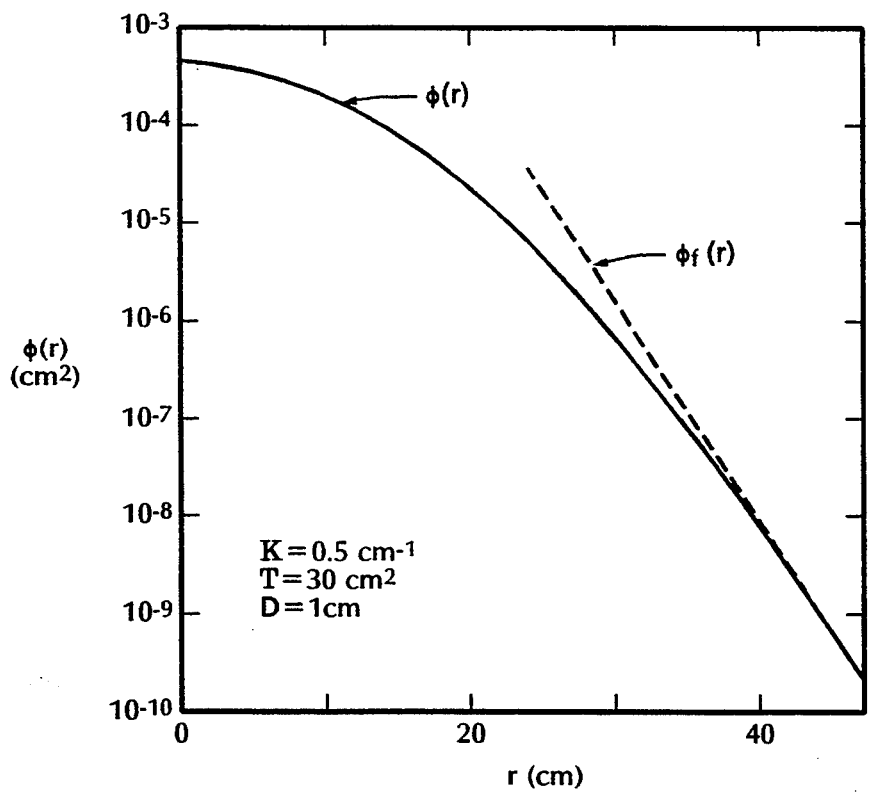

Shown in FIG. 6 are plots of the normalized thermal neutron flux versus the radius r obtained from Eqs. (1) and (4) for k=0.5 cm$^{-1}$ and t=30 cm$^2$. Without loss of generality, D=1 cm was chosen in this example. The solid line in FIG. 6 represents the thermal neutron flux obtained from the exact solution in Eq. (1). The broken lines represent the far field approximation which is practically identical to the exact solution in the range of r satisfying r>40 cm, which is larger than 2k$\tau$. From Eq. (4) it will be noted that the neutron flux decreases exponentially as the distance from the source increases.

As shown in FIG. 1, thermal neutrons penetrate through soil 12 and enter the nitrogen-rich materials in body 10. Nitrogen atoms in the materials capture thermal neutrons and emit $\gamma$-rays at an energy level of 10.8 MeV. The production rate dN/dt of the 10.8 MeV $\gamma$-rays is given by:

$$\frac{dN}{dt} = \Gamma n_o \sigma q \Delta V, \tag{5}$$

where $\Gamma$ is the average thermal neutron flux at a mine with volume $\Delta V$, $n_o$ is the nitrogen atom density in nitrogen-rich material, $\sigma = 7 \times 10^{-26}$ cm$^2$ is the neutron capture cross section of nitrogen, and q=0.15 is the branching fraction for emission of a 10.8-MeV -$\gamma$-ray.$^{12}$. The nitrogen atom density in TNT is $2 \times 10^{22}$ atoms/cm$^3$. With the $\gamma$-ray detector 36 located near the neutron source 22, only a fraction of these $\gamma$-rays propagates back toward the detector. During propagation through soil 12 and water 16, the intensity of the $\gamma$-rays is reduced by attenuation. The D-T fusion in the neutron generator 28 of source 22 is expressed as:

$$D+T \rightarrow He^4(3.5 \text{ MeV})+n(14.1 \text{ MeV}), \tag{6}$$

Figure 3:
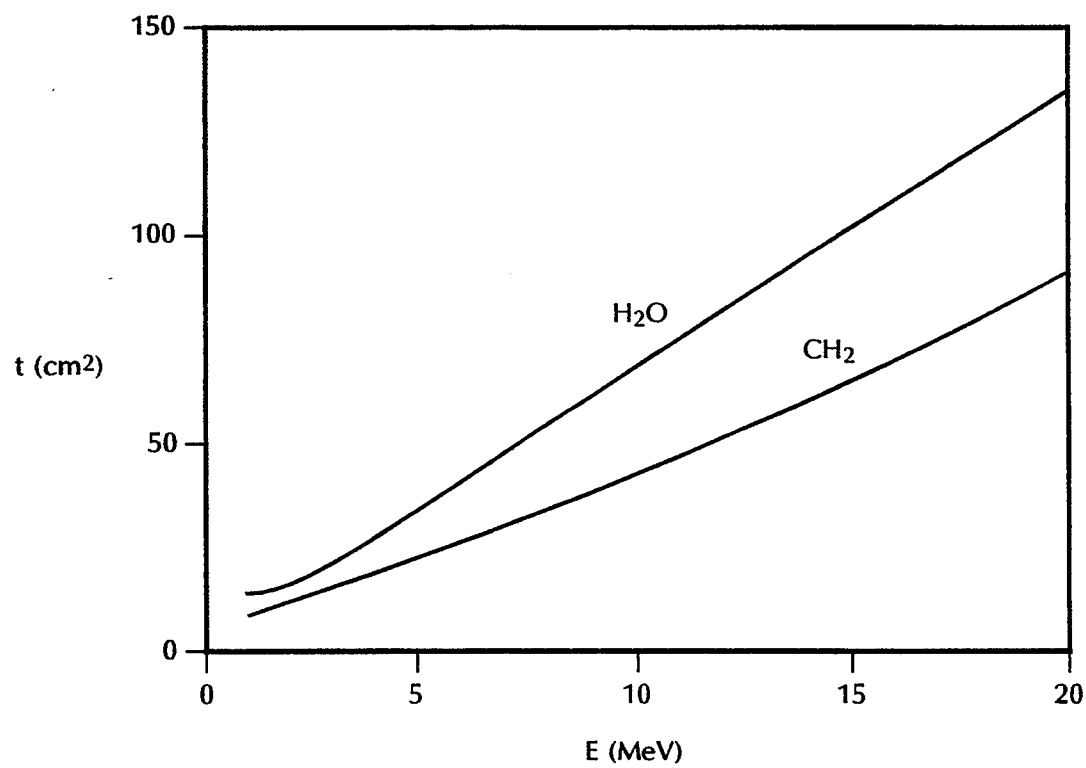
FIGS. 3–8 are graphical illustrations of various parameters associated with the system of the present invention.

From the graphical data in FIG. 3, the Fermi age of the 14 MeV neutrons in the water is $\tau$=83 cm$^2$, ensuring a reasonable penetration distance. With the output of the neutron source 22 having an intensity of 10" neutrons S$^{-1}$ and a distance above sea bottom 21 of d=30 cm, the thermal neutron flux at the sea bottom is estimated to be $7 \times 10^6$ cm$^{-2}$ sec$^{-1}$ from the dotted line in FIG. 4. The intensity of the thermal neutron flux is further reduced as the neutrons penetrate through soil 12 at the bottom of the sea, according to an appropriate expression:

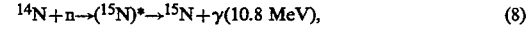

$$\phi(x) = \frac{\phi_b}{2} \exp(-k_s x), \tag{7}$$

where $\phi_b$ is the neutron flux at the bottom and x (in cm unit) is the penetration depth into the soil. Note that the factor 2 in the denominator in Eq. (7) originates from the fact that the neutron flux at the sea bottom is a collection in all directions and only the flux in the forward direction will propagate toward the buried body of nitrogen-rich material 10. Therefore, assuming that nitrogen-rich material is buried at 30 cm, the thermal neutron flux at the nitrogen-rich material is approximately given by $\Gamma = 1.7 \times 10^5$ cm$^2$ sec$^{-1}$ based on Eq. (1), taking into account two different media, namely water and soil.

Nitrogen atoms in the material of body 10 will capture thermal neutrons and emit the 10.8-MeV $\gamma$-rays. The nuclear reaction is expressed as:

$$^{14}N + n \rightarrow (^{15}N)^* \rightarrow ^{15}N + \gamma(10.8 \text{ MeV}), \tag{8}$$

where ($^{15}$N)* denotes an excited state of nitrogen 15. The $\gamma$-rays emitted from the nitrogen-rich material is calculated from Eq. (5) and estimated to dN/dt=$3 \times 10^4$ sec$^{-1}$. Only a fraction of these $\gamma$-rays propagate back toward the $\gamma$-ray detector 36. During propagation through soil and water, the intensity of the $\gamma$-rays is reduced to one tenth of its original value. Assuming that the $\gamma$-ray detector is a disc having a radius of 35 cm, one tenth of the γ-rays emitted from the nitrogen-rich material heads toward the γ-ray detector. Therefore, the number of γ-rays entering the γ-ray detector is calculated to be $3 \times 10^2$ sec$^{-1}$, which means that 15 γ-rays are registered in the detector every 50 milliseconds. Since the background noise level of γ-rays in energy higher than 8 MeV is very low in the bottom of the sea, fifteen γ-rays will provide identification of the nitrogen-rich material. Therefore, the detector 36 can move at speed of 10 meter/sec. If the detector is 15 cm above sea bottom, the number of the γ-rays entering the detector is more than $3 \times 10^3$ sec$^{-1}$ which will provide better resolution of the nitrogen-rich material location. Experiments indicate that 15 γ-rays of 10.8 MeV energy are emitted from 100 excited nitrogen atoms in a $^{14}$N (n,y)$^{15}$N reaction to provide a unique identification for nitrogen. No other element in sea water and soil is able to produce such a meaningful amount of γ-rays with energies greater than 8 MeV. Thus, increases in high energy (>8 MeV) gamma rays indicate high nitrogen concentrations, which can be used to identify explosive materials.

Eq. (4) and FIG. 6 also indicate that the thermal neutrons attenuate quickly in water. For example, the thermal neutron flux at 1 m away from the source is calculated to be $2.75 \times 10^{-2}$ cm$^{-2}$ sec$^{-1}$ which is practically zero. This indicates that underwater detection by the system hereinbefore described can be accomplished, while providing radiation protection for human and marine life.

In accordance with another embodiment of the invention, a portable type of detection unit for nitrogen-rich materials in sea water, similar in size and weight to the metal detector in beaches, will be very useful in some cases. For this type of system, the neutron source is fission neutron material, such as californium 252. Such neutron source and γ-ray detector unit may be swept over bottom of the sea, where nitrogen-rich materials are buried in order to systematically study thermal neutron flux in soil at the sea bottom. For this embodiment of the invention, the density ratio is defined as:

$$g = \frac{n_s}{n_w}, \quad (9)$$

where $n_w$ is the density of water molecule in water and $n_s$ is the density of silicon dioxide molecule in soil, assuming that the solid part of soil is mostly silicon dioxide. Where the density ratio $g=1$, the soil is predominantly silicon dioxide without water in it, while, $g=0$ indicates that only water is the embedding medium. In reality, soil components at the sea bottom vary considerably from region to region and the neutron transport theory must be tailored for each case.

Figure 7:
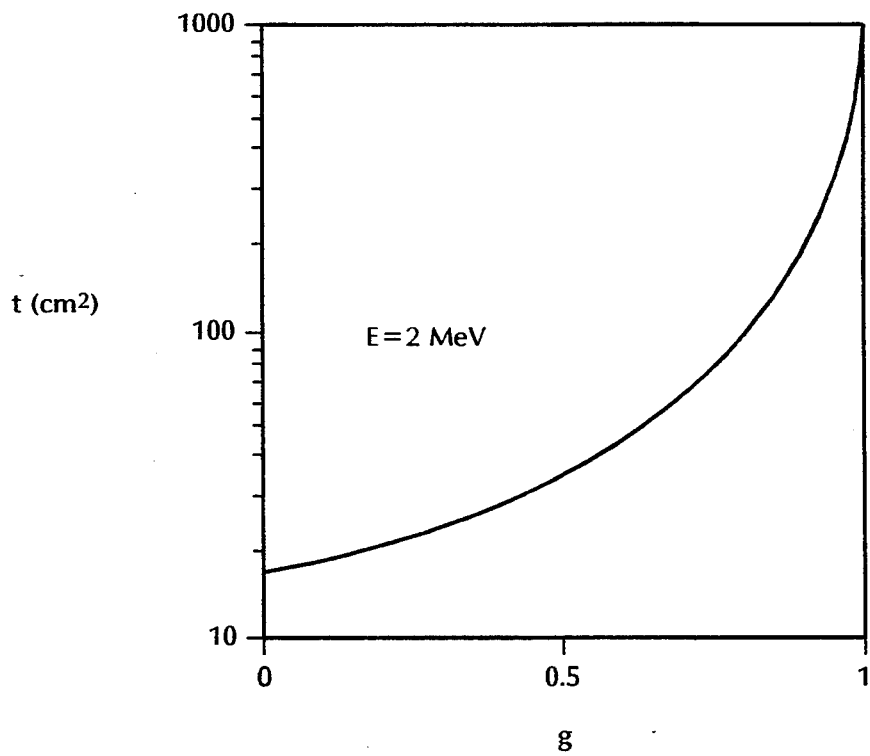

Shown in FIG. 7 is plot of the Fermi age τ versus the density ratio g obtained from Eq. (3) for fast neutron energy of E=2 MeV indicating that the average energy of neutrons emitted from californium 252 is 2 MeV. The Fermi age of thermal neutron increases drastically from τ=17 cm$^2$ to τ=976 cm$^2$ as the density ratio g increases from zero to unity. The greater the water content in soil, the less the Fermi age. Water content in the sea bottom soil, depends on various soil conditions. The diffusion constant of thermal neutrons in soil is calculated by making use of the scattering cross section of the neutrons by hydrogen, oxygen, and silicon atoms, the result is expressed as:

$$D = \frac{0.194}{[1 - g + 0.08(1 + g)]}, \quad (10)$$

where D is in units of cm. Similarly, the reciprocal length k is expressed as $$k = 0.308 \sqrt{[1 - g + 0.08(1 + g)][1 - g + 0.2g]}, \quad 11$$

A few examples of thermal neutron flux have been calculated for soil of different water content. Table II below summarizes important physical quantities based on such flux calculations.

TABLE II

| Physical parameters of thermal neutrons in a soil for fast neutrons with initial energy of 2 MeV | | | |
|---|---|---|---|
| γ | D (cm) | κ (cm$^{-1}$) | τ (cm$^2$) |
| 0 | 0.18 | 0.32 | 17 |
| 0.25 | 0.228 | 0.254 | 23 |
| 0.5 | 0.313 | 0.188 | 36 |
| 0.75 | 0.497 | 0.122 | 78 |
| 0.95 | 0.942 | 0.068 | 316 |
| 1 | 1.21 | 0.055 | 976 |

Figure 8:
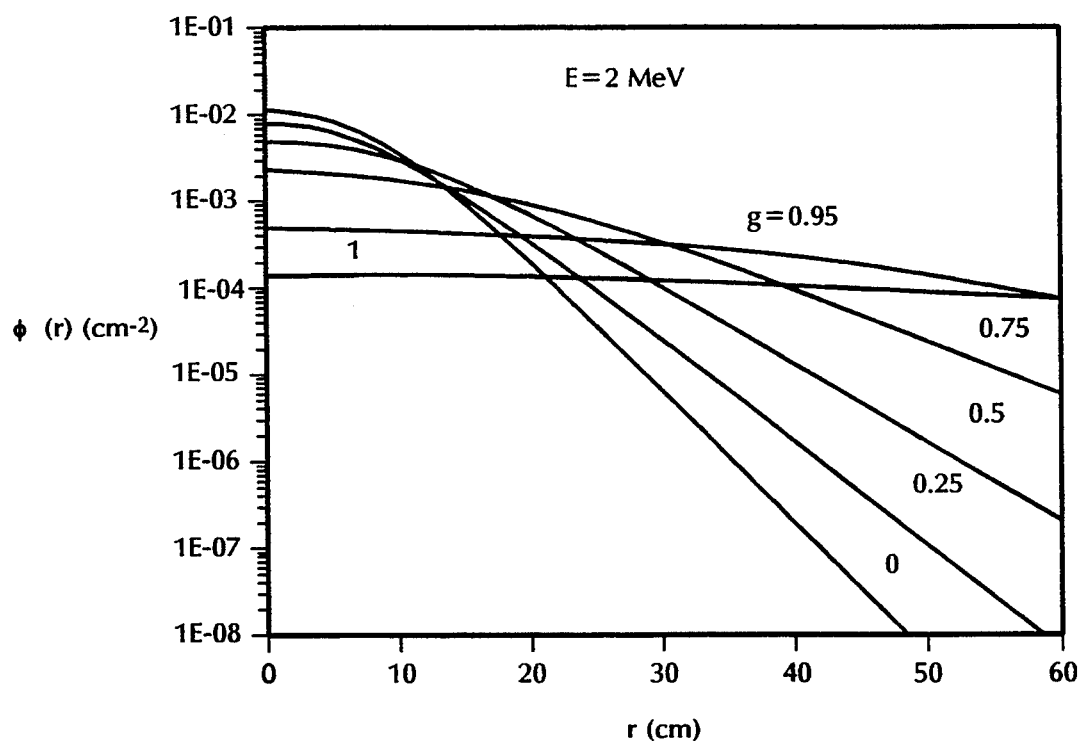

Shown in FIG. 8 are plots of normalized thermal-neutron flux versus the radius r obtained from Eq. (1) for fast neutron energy of E=2 MeV and several different values of the density ratio g. The thermal-neutron flux attenuate fast when the water content if soil is large. Typical water content in soil at the sea bottom is about 25 percent corresponding to g=0.75. In this case, the thermal-neutron flux decreases rather slowly as the transport distance r increases. Therefore, assuming that the neutron source with an intensity of $10^{10}$ neutrons s$^{-1}$ is located just above the sea bottom and a nitrogen-rich material is buried at 30 cm underneath of the soil surface, the thermal neutron flux at the nitrogen-rich material is approximately given by $\Gamma = 3.3 \times 10^6$ neutrons cm$^{-2}$ sec$^{-1}$. The emission rate of 10.8-MeV γ-rays emitted from the nitrogen-rich material is calculated from Eq. (5) as $dN/dt = 6.9 \times 10^5$ sec$^{-1}$. During propagation through soil, the intensity of the γ-ray is reduced to one tenth of its original value. Assuming that the γ-ray detector 36 is a disc type with a radius of 5 cm, one two-hundredth of the γ-rays emitted from the nitrogen-rich material heads toward the γ-ray detector. The number of γ-rays entering the γ-ray detector is calculated to be $3.5 \times 10^2$ sec$^{-1}$ which means that 17 γ-rays are registered in the detector every 50 milliseconds. Thus, the detector can move at a speed of 2 meter/sec.

Soil on land also contains some water, which can moderate fast neutrons to thermalize. The curve denoted by g=0.95 in FIG. 8, represents the normalized thermal-neutron flux in the soil which contains 5 percent water. Making use of this thermal neutron flux, the aforementioned portable type of detector unit can also be useful in locating and identifying nitrogen-rich materials on land. Thus, for physical parameters hereinbefore referred to, the thermal flux at the nitrogen-rich material buried 30 cm below the soil surface is given by $\Gamma = 3 \times 10^6$ neutrons cm$^{-2}$ sec$^{-1}$ for g=0.95. For a nitrogen-rich body that is $10 \times 10 \times 10$ cm$^3$ the number of γ-rays entering the γ-ray detector at the soil surface is calculated to be $3.2 \times 10^2$ sec$^{-1}$. Accordingly, 16

γ-rays are registered in the detector every 50 milliseconds to clearly demonstrate that the portable type of detector unit is also very effective in locating nitrogen-rich materials on land.

The detection system hereinbefore described will provide complete identification of nitrogen-rich materials buried in soil under the sea based on a high flux of neutrons penetrating water and soil to interact with the soil buried nitrogen-rich materials. Nitrogen atoms in the buried materials capture thermal neutrons and emit high energy level γ-rays, which are a signature of the nitrogen-rich materials. Assuming that a fast neutron source is located at the origin, the neutron distribution has been described as a function of distance from the source. Based on the model described, it was shown that the thermal neutron flux is a simple function of the diffusion constant D, the reciprocal length k and the Fermi age $\tau$ of a moderator material.

The fast detection system according to one embodiment hereinbefore described makes use of electrically generated neutrons with energy of 14 MeV and intensity $10^{11}$ neutrons $\sec^{-1}$. As a consequence, the fast detection system is bulky and heavy and must therefore be mounted on an autonomous tracked vehicle. However, this detection system can cover a large field area in a short time and quickly provide a map of the nitrogen-rich material field. When the neutron source 22 is switched on and off by the safety interlock 26, adequate safety protection is provided for human and marine life. On the other hand, a hand-carried detector unit makes use of a fission neutron source with energy of 2 MeV and intensity of $10^{10}$ neutrons $\sec^{-1}$ movable at a speed of 2 meter/sec to identify nitrogen-rich materials buried in soil under sea. The hand-carried unit is also very effective in locating nitrogen-rich materials on land.

In summary, the present invention provides for the location of nitrogen materials by detection of gamma rays emitted therefrom upon capture of fast neutrons from a movable source located a substantial distance from the materials being analyzed. Such capability of the invention is based on travel of the neutrons through a moderator medium such as sea water as an effective means to thermalize the fast neutrons. Analysis of the neutron capturing materials by detection of gamma radiation emitted therefrom is based on the relationship of neutron distribution to distance from its origin, wherein the thermal neutron flux is a simple function of the diffusion constant (D), reciprocal length (k) and Fermi age ($\tau$) of the sea water. Accordingly, the thermal neutron flux at its origin is proportional to the square of the moderator (sea water) density, and such flux increases drastically with an increase in Fermi age.

Figure 2:
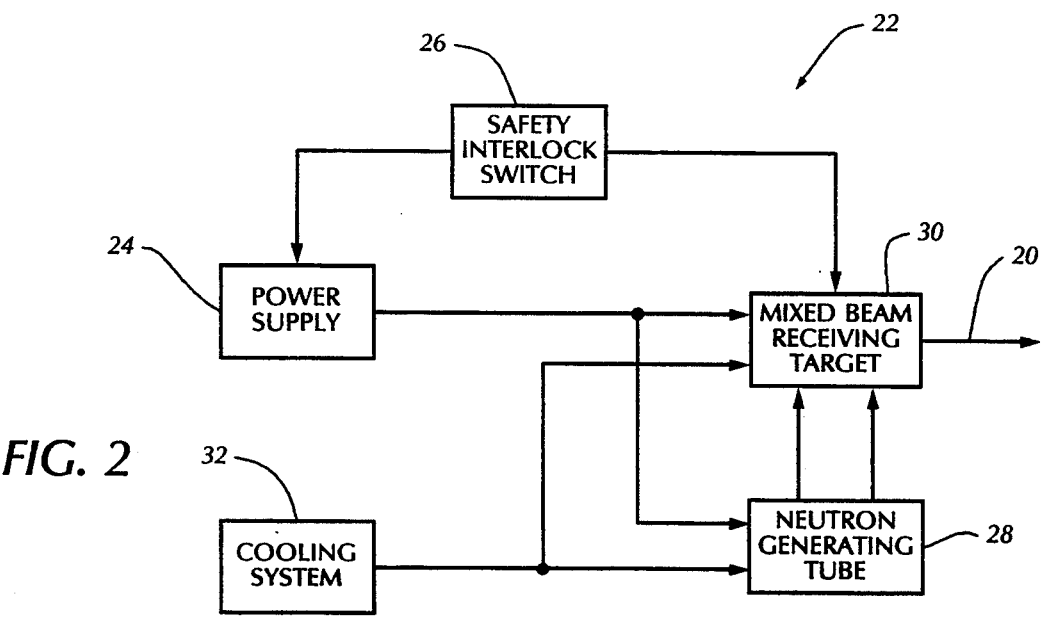
FIG. 2 is a more detailed diagram of the neutron source shown in FIG. 1, in accordance with one embodiment of the invention.

With respect to location of underwater buried mines in particular as the nitrogen-rich material 10, detection of gamma rays having a predetermined signature energy level of 10.8 MeV, is associated with either (a) electrical generation of neutrons at its moving origin with an energy of 14 MeV and an intensity of $10^{11}$ neutrons per second, or (b) use of a fission neutron source at the moving origin with an energy of 2 MeV and an intensity of $10^{11}$ neutrons per second. Utilizing the electrically generated source 22 of neutrons at the moving neutron origin, a relatively large field area may be covered in a short time to rapidly provide a field map. Switch on and off of the power supply 24 for the neutron source 22 by the safety interlock switch 26, as diagrammed in FIG. 2, provides for operator protection. The fission neutron source at the origin on the other hand, is associated with a portable hand carried type of detector unit, movable at a speed of 2 meters per second to locate nitrogen-rich material. Such portable type of detector unit is furthermore effective in locating on land where the soil is mixed with water.

Numerous other modifications and variations of the present invention are possible in light of the foregoing teachings. It is therefore to be understood that within the scope of the appended claims the invention may be practiced otherwise than as specifically described.

I claim:

1. In a method of sensing nitrogen-rich explosives within an embedding medium by capture therein of neutrons emitted from a continuously moving source in spaced relation to said explosive, causing emission therefrom of gamma rays, the steps of: thermalizing said emitted neutrons prior to reaching the nitrogen-rich explosives by penetration of said embedding medium; detecting said gamma rays in spaced adjacency to the continuously moving source; and tracking the nitrogen-rich explosives in response to measurement of the detected gamma rays above a predetermined signature energy level corresponding to said explosives.

2. The method of claim 1 wherein said step of thermalizing the emitted neutrons comprises location of the continuously moving neutron source within water as a hydrogen-rich surrounding medium different from said embedding medium.

3. The method of claim 2 wherein said embedding medium is underwater soil.

4. The method of claim 1 wherein said embedding medium is underwater soil.

5. The method of claim 4 wherein said neutrons are emitted from the moving source at an energy level of substantially 14 MeV and a flux density of $10^{11}$ neutrons per second while the predetermined signature energy level of the detected gamma rays is 8 MeV.

6. The method of claim 1 wherein said neutrons are emitted from the moving source at an energy level of substantially 2 MeV and a flux density of $10^{10}$ neutrons per second while the predetermined signature energy level of the detected gamma rays is 8 MeV.

7. In a method of sensing nitrogen-rich materials buried in soil and water by capture of neutrons causing emission of gamma rays therefrom, the steps of: emitting said neutrons from a source during movement within the water in spaced relation to the soil and at a predetermined energy level enabling sequential penetration of the soil and the nitrogen-rich materials after thermalization by the water; detecting said gamma rays in spaced adjacency to said source; and measuring energy level of the detected gamma rays above a predetermined energy signature to map location of the nitrogen-rich materials during said movement of the source.

8. The method of claim 7 wherein said soil is a sea bed located below the water.

9. The method of claim 7 wherein said soil and water form an earth mixture.

10. The method of claim 8 wherein said predetermined energy signature level is 8 meV.

11. The method of claim 10 wherein said nitrogen-rich materials are explosives of underwater mines.

* * * * *